United States Patent
Scheich (10) Patent No.: US 12,380,627 B2
(45) Date of Patent: Aug. 5, 2025

(54) AUTOMATIC ADJUSTABLE MANNEQUIN

(71) Applicant: Ovad Custom Stages, LLC, Troy, MI (US)

(72) Inventor: Davo Scheich, Troy, MI (US)

(73) Assignee: Ovad Custom Stages, LLC, Troy, MI (US)

( * ) Notice: Subject to any disclaimer, the term of this patent is extended or adjusted under 35 U.S.C. 154(b) by 367 days.

(21) Appl. No.: 17/639,946

(22) PCT Filed: Sep. 11, 2020

(86) PCT No.: PCT/US2020/050322
§ 371 (c)(1),
(2) Date: Mar. 3, 2022

(87) PCT Pub. No.: WO2021/050821
PCT Pub. Date: Mar. 18, 2021

(65) Prior Publication Data
US 2022/0327766 A1 Oct. 13, 2022

Related U.S. Application Data (60) Provisional application No. 62/898,660, filed on Sep. 11, 2019.

(51) Int. Cl.
*G06T 15/08* (2011.01)
*A41H 1/04* (2006.01)
(Continued)

(52) U.S. Cl.
CPC ............... *G06T 15/08* (2013.01); *A41H 1/04* (2013.01); *A41H 5/00* (2013.01); *G06T 7/55* (2017.01)

(58) Field of Classification Search
CPC .. G06T 15/08; G06T 7/55; A41H 1/04; A41H 5/00; G06Q 30/0643; A47F 8/00
See application file for complete search history.

(56) References Cited

U.S. PATENT DOCUMENTS 6,968,075 B1   11/2005 Chang
9,696,130 B1 *  7/2017 Eakins ................... G01B 21/20
(Continued)

FOREIGN PATENT DOCUMENTS

JP    H09106419 A    4/1997

OTHER PUBLICATIONS

Werghi, Naoufel. "Segmentation and Modeling of Full Human Body Shape From 3-D Scan Data: A Survey." IEEE Transactions on Systems, Man, and Cybernetics—Part C: Applications and Reviews 37.6 (2007). (Year: 2007).*

(Continued)

*Primary Examiner* — Leon Viet Q Nguyen
(74) *Attorney, Agent, or Firm* — MaxGoLaw PLLC (57) ABSTRACT

An automated adjustable mannequin is provided for use as a platform for producing computer generated fashion model clothing displays. The clothing displays may be static photographs or video. The mannequin combines manually adjustable dress forms currently used by seamstresses and clothing designers with three dimensional scanning and photographic technologies. Actual body scan data of a living model may be used to automatically adjust the shape or contours of a dress form in real time to match the size and dimensions of a previously photographed model. The automated adjustments to the mannequin may be made at a rate of one frame at a time or 30 frames per second, where the body-form adapts to changes in the underlying model's movements.

15 Claims, 11 Drawing Sheets

(51) Int. Cl.
*A41H 5/00* (2006.01)
*G06T 7/55* (2017.01)

(56) References Cited

U.S. PATENT DOCUMENTS

| | | | | |
|---|---|---|---|---|
| 2005/0228608 | A1* | 10/2005 | Wells | G06F 8/38 |
| | | | | 702/127 |
| 2011/0022396 | A1* | 1/2011 | Van De Sluis | H05B 47/12 |
| | | | | 382/164 |
| 2013/0238285 | A1* | 9/2013 | Volchek | A41H 5/01 |
| | | | | 702/188 |
| 2013/0258045 | A1* | 10/2013 | Wojciech | H04N 23/6812 |
| | | | | 318/695 |
| 2015/0013430 | A1 | 5/2015 | Chhugani et al. | |
| 2016/0100087 | A1* | 4/2016 | Scheich | G06T 1/0007 |
| | | | | 348/47 |
| 2016/0219265 | A1* | 7/2016 | Adeyoola | G06Q 30/0625 |
| 2017/0156430 | A1* | 6/2017 | Karavaev | G06Q 30/0643 |
| 2017/0200297 | A1 | 7/2017 | Robertson | |

OTHER PUBLICATIONS

Daanen, Hein AM, and Frank B. Ter Haar. "3D whole body scanners revisited." Displays 34.4 (2013): 270-275 (Year: 2013).*
Int'l Search Report for PCT/US2020/050322, dated Dec. 15, 2020.

* cited by examiner

AUTOMATIC ADJUSTABLE MANNEQUIN

RELATED APPLICATIONS

This application claims priority benefit of U.S. Provisional Application Ser. No. 62/898,660 filed 11 Sep. 2019, the contents of which are hereby incorporated by reference.

FIELD OF THE INVENTION

The present invention in general relates to fashion photography; and in particular, to an automatic adjustable mannequin with contours based on the dimensions of the subject wearing the fashion being photographed.

BACKGROUND OF THE INVENTION

Computer-generated imagery (CGI) is the application of computer graphics to create or contribute to images in art, printed media, video games, films, television programs, shorts, commercials, videos, and simulators. The visual scenes may be dynamic or static and may be two-dimensional (2D), though the term "CGI" is most commonly used to refer to three-dimensional (3D) computer graphics used for creating scenes or special effects in films and television.

Figure 1:
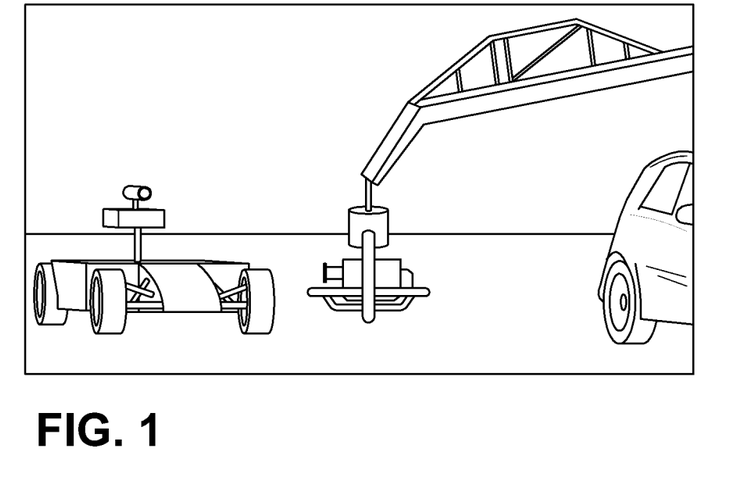
FIG. 1 is a line drawing of a photograph of the filming of an existing blackbird vehicle in action.
Figure 2:
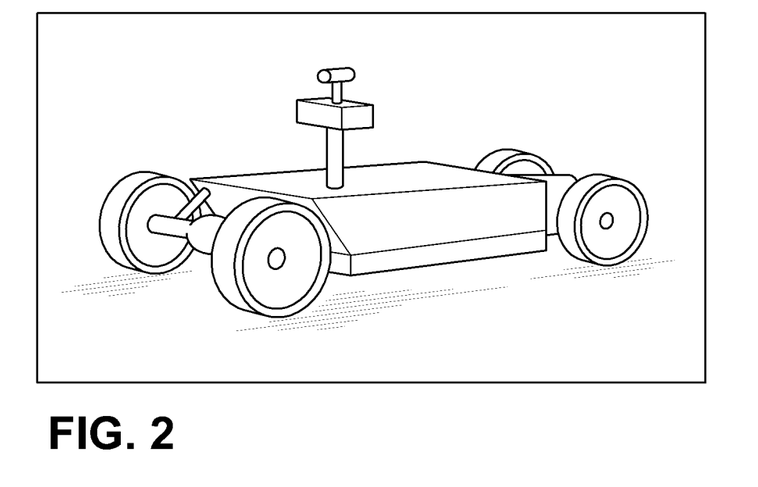
FIG. 2 is a line drawing of a photograph of the blackbird vehicle that illustrates the reconfigurable vehicle platform with an adjustable wheel base.
Figure 3A:
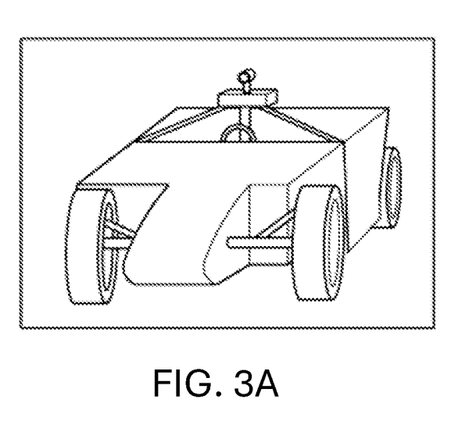
FIGS. 3A-3D show the progression of an overlay of a computer generated car body over the blackbird platform.
Figure 3B:
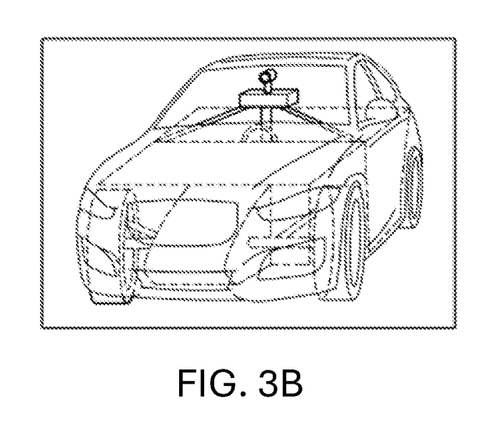
Figure 3C:
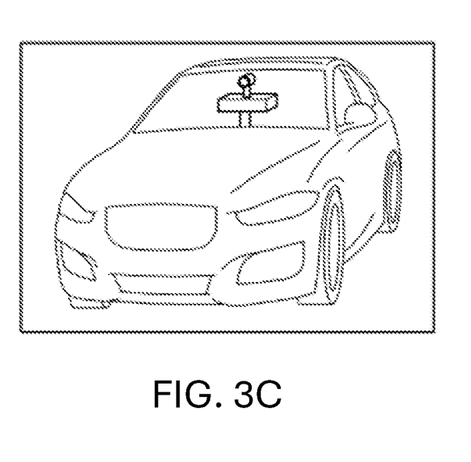
Figure 3D:
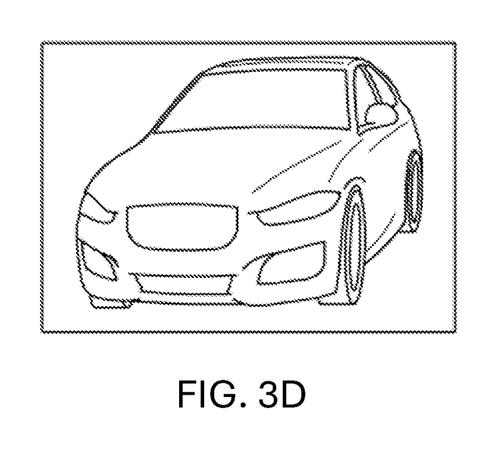

An example of the use of CGI is the introduction realistic looking cars into real world live action scenes. FIG. 1 is illustrates the filming of a blackbird vehicle in action. The blackbird is a reconfigurable vehicle platform with an adjustable wheel base as shown in FIG. 2, platform width, suspension, and vehicle specific wheels that re-configures itself to simulate running footage of any other vehicle. The blackbird conforms to the specification of a desired vehicle and is outfitted with the actual wheels and tires from the desired final vehicle. When filmed, the car's contact with the road and the wheels are real, and the blackbird platform is composited or overlaid with a CGI generated 3D shell with lighting that comes from a high-dynamic-range imaging (HDRI) reference onboard the blackbird. High-dynamic-range imaging (HDRI) is a high dynamic range (HDR) technique used in imaging and photography to reproduce a greater dynamic range of luminosity than is possible with standard digital imaging or photographic techniques. The aim is to present a similar range of luminance to that experienced through the human visual system. Sensors and markers allow the 3D car to automatically be stripped into the real footage. FIGS. 3A-3D show the progression of an overlay of a computer generated car body over the blackbird platform. The still images drawn in FIGS. 3A-3D were obtained from a video of a moving blackbird platform with the car body seamlessly generated by the computer moving in sync with the blackbird platform and blended with the surroundings.

A common technique employed by the retail and fashion industries is to retouch or place items of clothing on existing model photography. However, this technique has varying degrees of success because the newly photographed clothes do not hang the same on a body-form, mannequin, or stand in model. These differences in how the fabric drapes make the final composite not visually believable. A company called Splashlight, LLC has created a set of "master" model images that all work with the same body-form mannequin. In the process used by Splashlight clothes are photographed on a body-form and then the outfits are retouched back onto the original master photos of the living models that the body-forms are based on the living model. Using this technique there are no ongoing fashion model costs and only a small studio is needed to capture new clothing. Furthermore, if the lighting is pre-configured to match the original model photos no technical skills are needed. However, a problem with this technique is repetition. For example, a catalog will start looking like paper cutouts since there just isn't enough variation in the possible model poses that match the restrictive body-form and in the composite. The lack of body and head movement becomes stale over time.

Thus, there continues to be need for improved techniques for generating fashion photographs.

SUMMARY OF THE INVENTION

An automated adjustable mannequin is provided. The automated adjustable mannequin includes a body with a torso, a set of adjustment dials that adjust contours, measurements, and dimensions of the body; and a set of servo motors for automatic adjustment of the set of adjustment dials that are driven by three dimensional (3D) data.

A system for fashion photography is provided. The system includes an automated adjustable mannequin as described above, a photographic stage or photographic booth that generates three dimensional (3D) data of a subject, and a computer with a storage medium.

A process is provided for producing computer generated fashion model clothing displays. The process includes obtaining three dimensional (3D) body scan data of a live subject, and providing the 3D body scan data to an automated adjustable mannequin as described above. Subsequently, articles of clothing are photographed on the adjusted mannequin, and the photographed articles of clothing are combined with images of the live subject using computer generated imagery.

BRIEF DESCRIPTION OF THE DRAWINGS

The subject matter that is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

DESCRIPTION OF THE INVENTION

The present invention has utility as an automated adjustable mannequin that may be used as a platform for producing computer generated fashion model clothing displays. The clothing displays may be static photographs or video. Embodiments of the inventive mannequin combine manually adjustable dress forms currently used by seamstresses and clothing designers with three dimensional scanning and photographic technologies. In a specific inventive embodiment, actual body scan data of a living model may be used to automatically adjust the shape or contours of a dress form in real time to match the size and dimensions of a previously photographed model. In a specific inventive embodiment automated adjustments to the mannequin may be made at a rate of one frame at a time or 30 frames per second, where the body-form adapts to changes in the underlying model's movements.

It is to be understood that in instances where a range of values are provided herein, that the range is intended to encompass not only the end point values of the range, but also intermediate values of the range as explicitly being included within the range and varying by the last significant figure of the range. By way of example, a recited range of from 1 to 4 is intended to include 1-2, 1-3, 2-4, 3-4, and 1-4.

Figure 4:
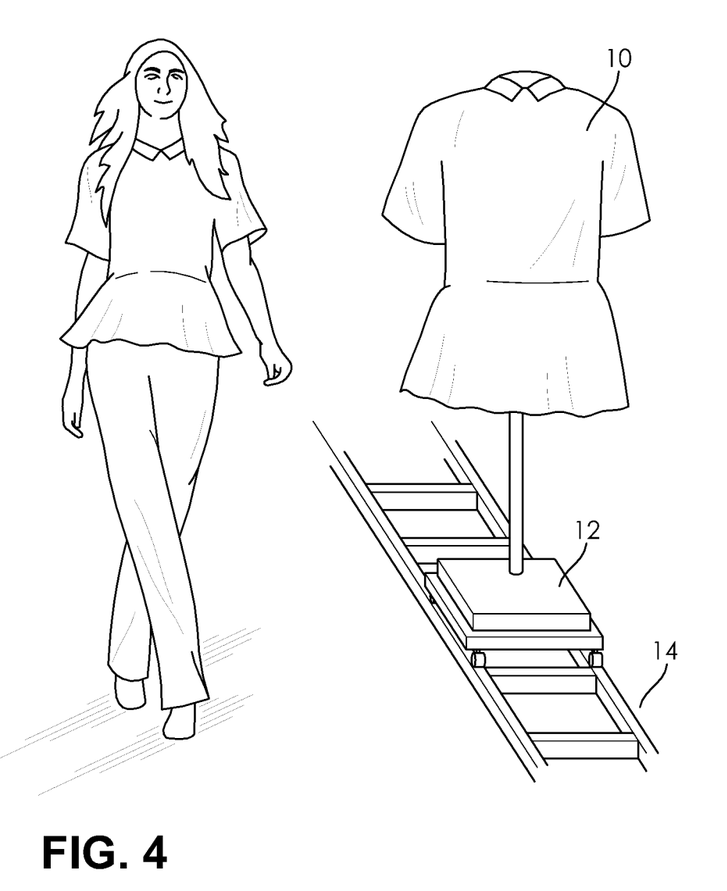
FIG. 4 shows an existing manual adjustable mannequin with twelve adjustment dials for making adjustment to the body contours of the form.
Figure 5:
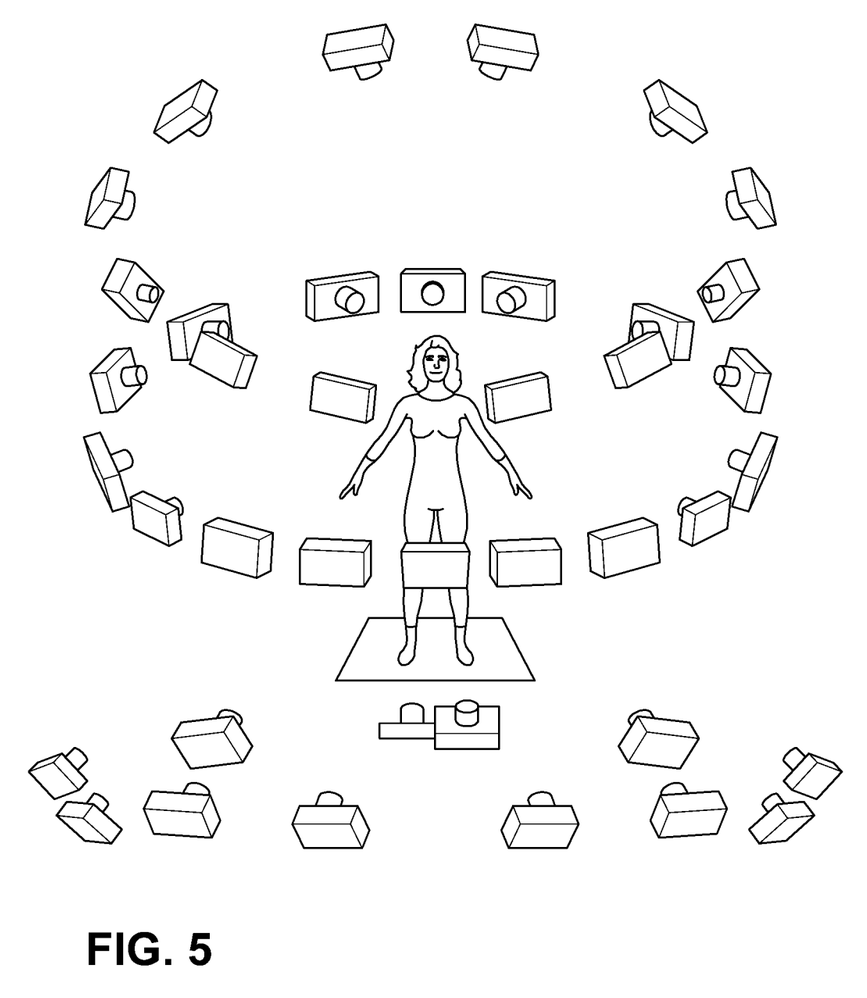
FIG. 5 illustrates an automated adjustable mannequin (cyvater) wearing a blouse, where the cyvater is mounted on a trolley and is moving along a track to simulate a moving model in accordance with embodiments of the invention.
Figure 6A:
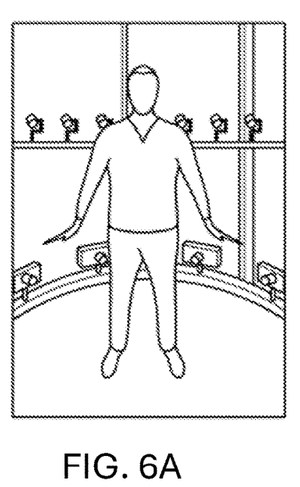
FIGS. 6A-6F illustrate a synchronized camera array of individual cameras that may be used to generate volumetric photographic data for a subject in a first pose in slight elevation (FIG. 6A), high elevation (FIG. 6B) and slight declination (FIG. 6C), and a second pose in slight elevation (FIG. 6D), high elevation (FIG. 6E) and slight declination (FIG. 6F)
Figure 6B:
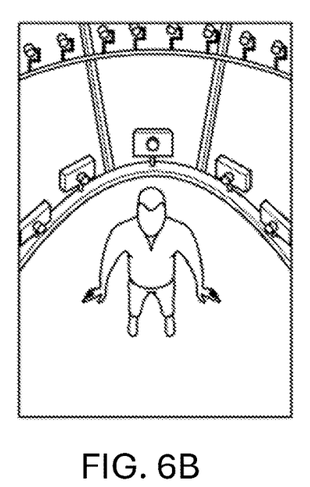
Figure 6C:
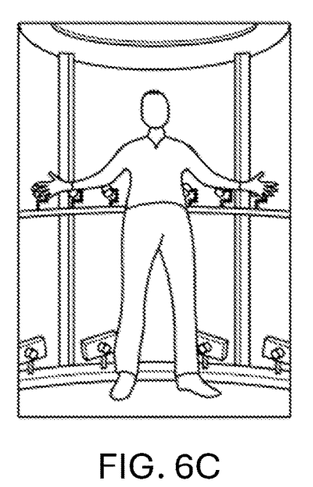
Figure 6D:
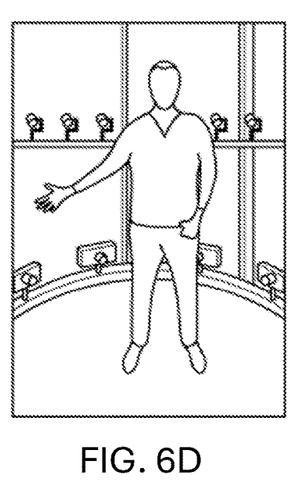
Figure 6E:
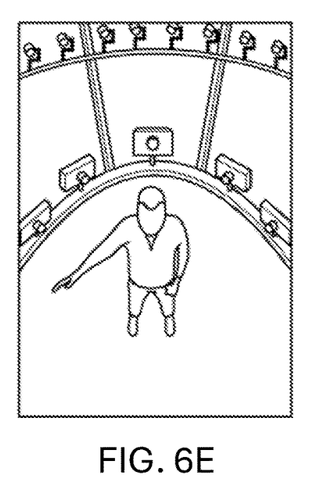
Figure 6F:
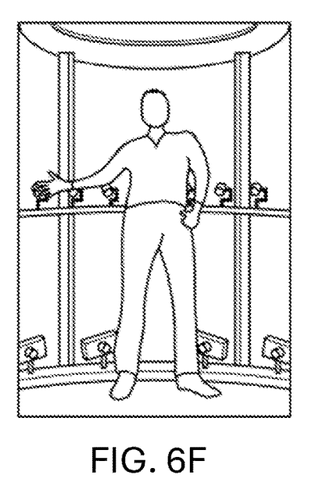

Inventive embodiments of the automated adjustable mannequin (referred to as a "cyvatar") may have these twelve adjustments plus additional available adjustments to the contours of the mannequin. The automated adjustments may be driven by servo motors (servos) that are driven by the 3D data collected at the time of the original model photography. Embodiments of the automated adjustable mannequin may be programmable and be able to morph with movements captured when the model is photographed or videoed in hundreds of different poses. Using the automated adjustable mannequin, every new outfit could have a corresponding original model pose. This greatly enlarged master library allows an entire catalog to be shot without repeating poses. FIG. 4 illustrates an automated adjustable mannequin (cyvater) 10 wearing a blouse, where the cyvater 10 is mounted on a trolley 12 and is moving along a track 14 to simulate a moving model.

Because of the limited amount of adjustability of the "cyvatar" the original 3D capture data of the model is not required to be high resolution. Keeping capture resolution just slightly higher than the resolution of the form can be adjusted to allow for very fast processing of the photogrammetry. This opens up a very large selection of original model shots as the time/cost of processing into a body-form isn't an issue.

In a specific inventive embodiment, a seamstress or tailor may keep dimensional profiles of clients on file in order to make custom fit clothing for their clients. For example, a unique identification number may be assigned to each client that may be entered into a controlling device or computer to reconfigure the automated adjustable mannequin to fit the contours and measurements of the client as stored in a database. In a specific inventive embodiment client measurement data for controlling an automated adjustable mannequin may be on a remote server or in the cloud so that a client may order custom clothing from a tailor or seamstress anywhere in the world who has a cyvatar.

At a seamstress or tailor quality level a standard three sided mirror could be outfitted with cell phone cameras to obtain a personal 3D shape accurately enough for a simple dress-form. For example, if a person wanted to rent a tuxedo they would send their "cyvatar" file and the tux would fit you right out of the box. Based on body type and age the model could be auto updated with very little new information such as height and weight. This provides the ability to have an accurate personalized 3D model to try on cloths from online retailers. Even though today users have the ability to adjust some sliders on an online avatar, this is nowhere as accurate as a personal 3D scan. Furthermore, the online avatar also relies on the end user to have an accurate body image.

In a further example, no retailer would use a body-form with twenty five adjustments to photograph a blouse with the number of possible combinations that represents. However with the inventive cyvatar system, the body-form automatically reconfigures itself and then triggers the camera while automatically cycling through all the possible combinations and automatically naming the files as the files are downloaded. This would allow a website to generate unique photos for all their fashions specifically tailored to the viewer. If the user allows website cookies to be stored on their device or a unique login is provided to the website that would allow a user to have a personalized batch of catalog images to preload in the background. In addition, each outfit could have a different pose original from the model to go with it. The difference for the retail store's photographer is now automated so the large number of combinations would not be an extra burden. While there are now more files to handle but would provide a better end user experience.

Photographic stages with synchronized camera arrays that may be used in the image capture process for 3D extraction for use with the automated adjustable mannequin. In the embodiments of the inventive process, live subjects are positioned inside a photographic volumetric capture stage. Volumetric video or volumetric filmmaking is a video technique that captures a three-dimensional space, such as a location or performance. Volumetric videography acquires data that can be viewed on flat screens as well as using 3D displays and virtual reality (VR) goggles. Volumetric videography combines the visual quality of photography with the immersion and interactivity of spatialized content to create 3D models.

Figure 7:
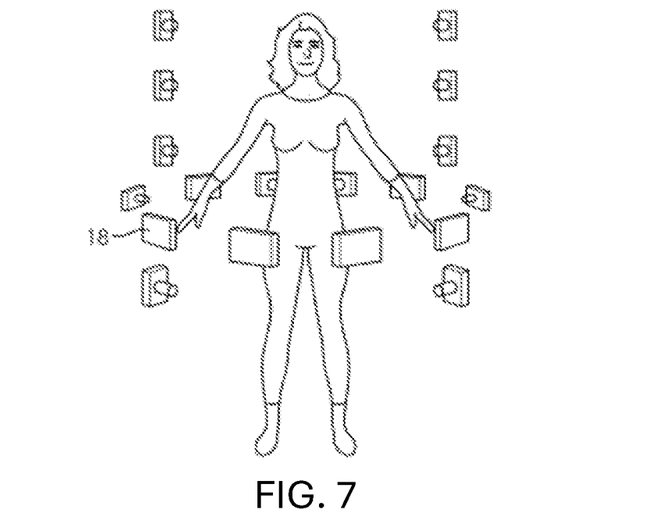
FIG. 7 illustrates a subject surrounded by an array of laser or infra-red (IR) devices to produce a point cloud.
Figure 8:
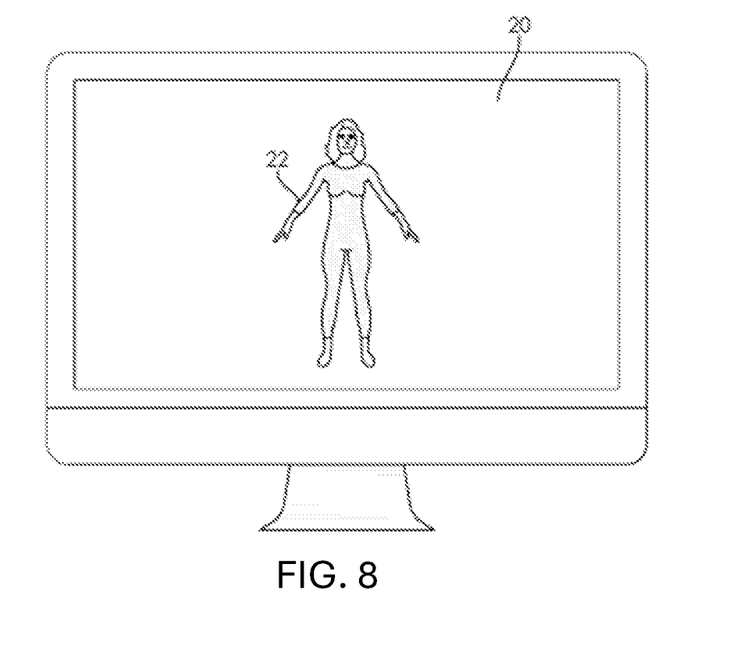
FIG. 8 illustrates a point cloud on a computer display produced from the scanned subject in FIG. 7.
Figure 9:
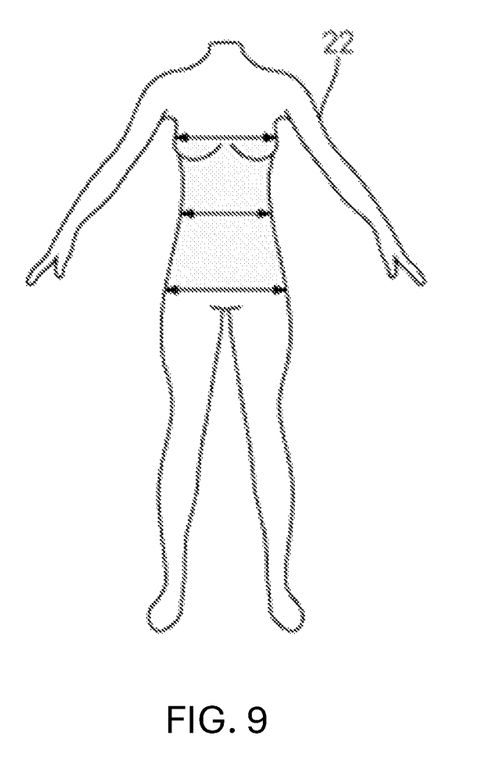
FIG. 9 illustrates measurements of the subject of FIG. 8 obtained from the point cloud in accordance with embodiments of the invention.
Figure 10:
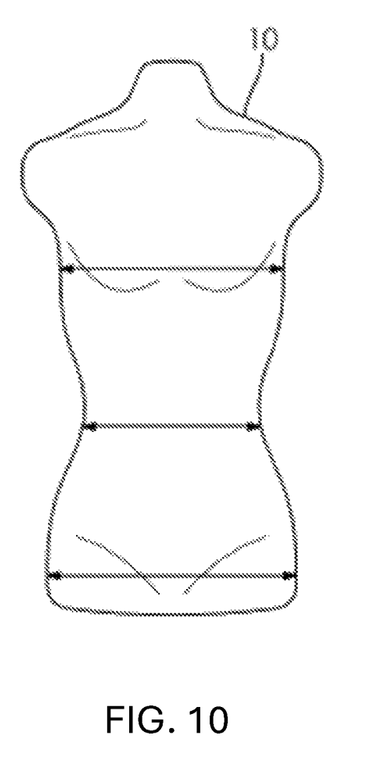
FIG. 10 illustrates the adjustment of size, shape, and position of an automated adjustable mannequin based on the measurements obtained from the point cloud of FIG. 10A in accordance with embodiments of the invention.
Figure 11A:
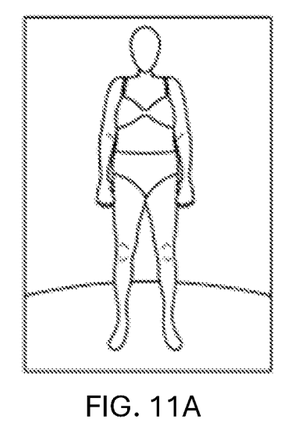
FIGS. 11A-11F are a representation of series of images of a subject from which measurements were obtained to generate commands for a computer numerical control (CNC) machining tool in accordance with embodiments of the invention.
Figure 11B:
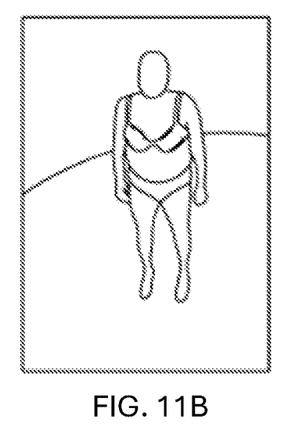
Figure 11C:
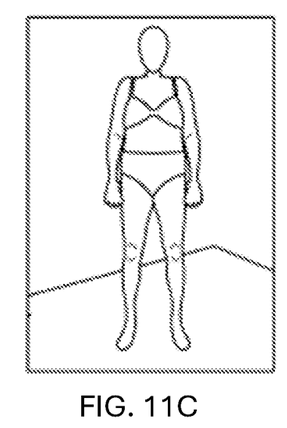
Figure 11D:
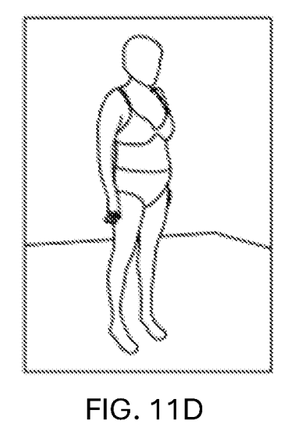
Figure 11E:
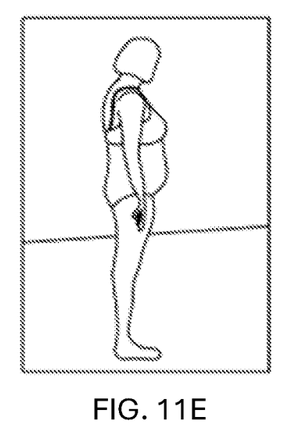
Figure 11F:
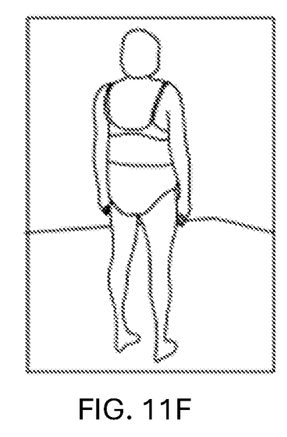

In practice a model is photographed in a skin tone, strapless bikini on a photogrammetry volumetric capture stage. The stage includes a group of capture devices generating footage of the subject from multiple angles. These capture devices may be still photography, video, infra-red (IR), stereo, or laser based (LIDAR). LIDAR scanning describes a survey method that uses laser-sampled points densely packed to scan static objects into a point cloud. Point clouds are distinct data point samples of three-dimensional space on the external surface of an object with position and color, which create a high fidelity representation of the real world with a huge amount of data. LIDAR requires physical scanners and produces enormous amounts of data. Any combination of these capture methods may be used. FIGS. 6A-6F illustrate a synchronized camera array of individual cameras 16 that may be used to generate volumetric photographic data. FIGS. 6A-6F illustrate perspective views of a model from various camera angles of the volumetric camera array. FIG. 7 illustrates a subject surrounded by an array of laser or IR devices 18 to produce a point cloud. Once captured the files from the individual devices (16 or 18) are run through photogrammetry software or other software to produce a 3D object of the model's pose. FIG. 8 illustrates a point cloud 22 on a computer display 20 produced from the scanned subject in FIG. 7. FIG. 9 illustrates measurements of the subject of FIG. 8 obtained from the point cloud 22. FIG. 10 illustrates the adjustment of size, shape, and position of an automated adjustable mannequin (cyvater) 10 based on the measurements obtained from the point cloud of FIG. 8.

Figure 12:
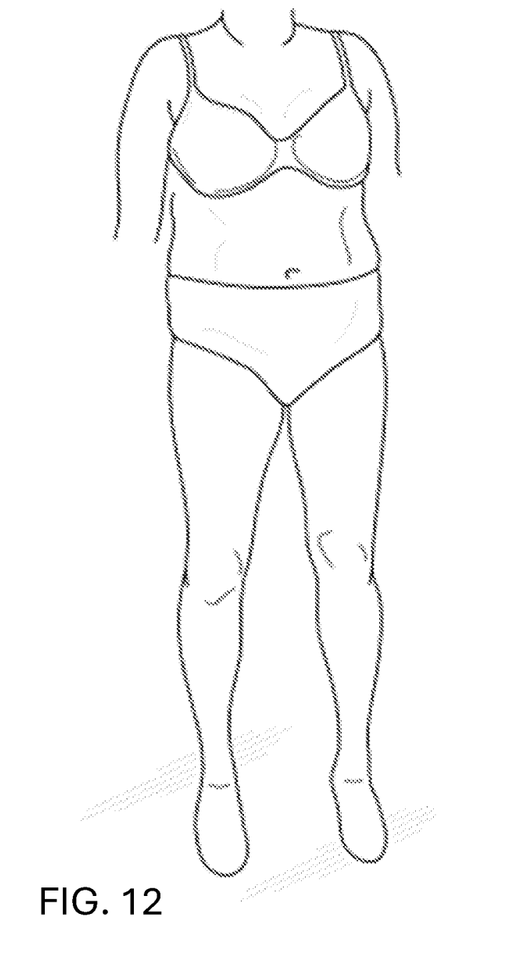
FIG. 12 illustrates a body-form formed in Styrofoam using the aforementioned CNC machining tool that exactly matches the subject of FIGS. 11A-11F in accordance with embodiments of the invention.

FIGS. 11A-11F are a series of images of a subject from which measurements were obtained to generate commands for a computer numerical control (CNC) machining tool. FIG. 12 illustrates a body-form formed in Styrofoam using the aforementioned CNC machining tool that exactly matches the subject of FIGS. 11A-11F. Any clothes put on this Styrofoam body-form would drape exactly as they would if worn by the subject of FIGS. 11A-11F. New outfits photographed from the same angle could be composited back onto the original photographs with 100% accuracy creating a totally believable final image. It is appreciated that a 3D printer may be used to generate a body-form from measurements of a subject.

Ideally the stage used in embodiments of the invention is setup for simultaneous volumetric capture and traditional fashion photography. The two systems may be synchronized or slightly off sync. One system capturing multiple angles with "flat" lighting to be used in the creation of a 3D object from the model. The other system capturing the footage with fashion lighting that will later be used as the master source for compositing new photography onto the model. The synchronization between the two systems may be accomplished by offsetting the two systems by a fraction of a second. The photographer illuminates the model using traditional beauty lighting, and the photographer would direct and photograph the model under this light in the standard way with a single camera. This camera may be fixed to a stand or be handheld, video, or stills. The original lighting style, position, and fixture intensities would be recorded for later duplication. This would work best as a fixed set-up that isn't changed between models. Keeping the camera lighting consistent will later make the composite process easier by only needing one lighting setup while photographing the new products. At the same time the set would contain a number of devices or cameras to capture volumetric data. The devices may be still, stereo, IR, laser, video or any other type of recording device. If needed these volumetric cameras may be triggered by the image camera but just a beat off allowing the image lighting to dissipate and a secondary flat lighting to be used for capture.

By way of example, a fashion photographer pushes the button on their camera and triggers light flashes that diminish in $\frac{1}{1000}$th of a second. The shutter of the camera may take $\frac{1}{250}$th of a second to close at which time the array of camera is triggered and in turn, triggers a secondary set of flat even lighting. This flat lighting may be flash or constant lighting that was on all the time but over powered by the fashion camera flashes. The resultant effect appears to be a single moment in time but is actually two or more different photo methods appearing to capture the model in the same moment in time. When just the right pose and expression of the model are selected from the shoot the corresponding volumetric camera array data is grouped with it.

The volumetric camera array data is used to build a very detailed 3D object of the original model. The volumetric data may be used to CNC a body-form to the exact life-size shape of the corresponding human model in that pose. Clothing may be placed on this body-form and re-photographed using the original fashion camera lighting and camera position. The resulting images can be 100% seamlessly and convincingly retouched onto the original model's beauty photo. If other angles are desired the 3D object can be skinned with the high resolution original captures the 3D object was made from. This may be done using standard photogrammetry software. The skinned object (virtual model) is turned, rolled, and scaled to match the new angle photograph of the outfit.

In a specific inventive embodiment only a low resolution 3D object is created using photogrammetry. The scene would only need to be captured with enough resolution to inform the basic shape of the subject, and additional resolution is not needed. The lower resolution greatly speeds up the process and lowers the equipment cost for production. This cruder 3D model may be used to drive the shape of an automated adjustable mannequin (cyvater) as previously described. The inventive automated adjustable mannequin (cyvater) is automatically adjusted by the informed data of the real world model's volumetric scan.

Figure 13A:
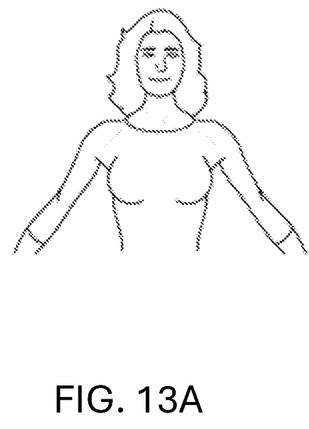
FIGS. 13A and 14A illustrate video volumetric data that is synchronized frame by frame to the adjustable body-form of the automated adjustable mannequin in accordance with embodiments of the invention.
Figure 13B:
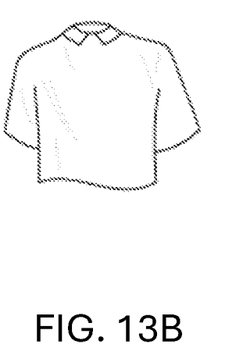
FIGS. 13B and 14B illustrate a new outfit being put on the green screen body-form of the automated adjustable mannequin and captured in full motion in accordance with embodiments of the invention.
Figure 13C:
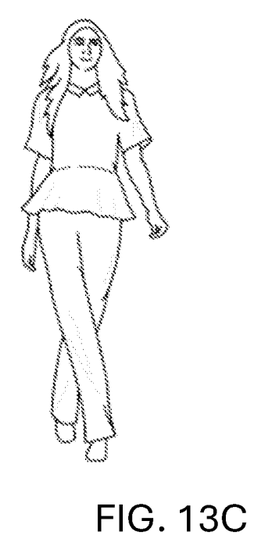
FIGS. 13C and 14C illustrate a composite of a fashion outfit with original model footage that shows seamless full motion playback of the original model wearing the new outfit in accordance with embodiments of the invention.
Figure 14A:
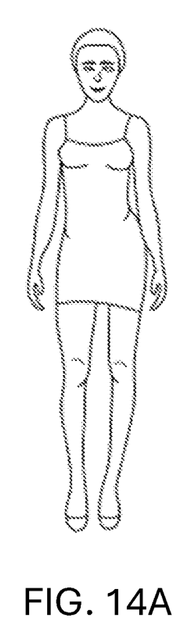
Figure 14B:
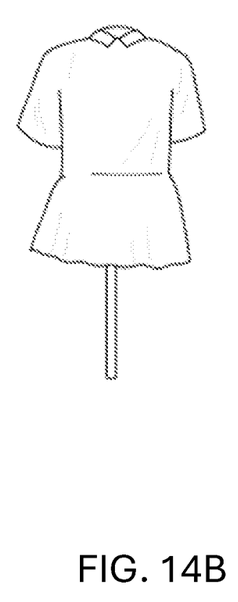
Figure 14C:
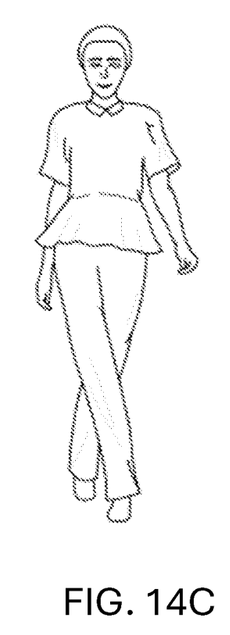

In a specific inventive embodiment, the automated adjustable mannequin (cyvater) may be driven by video volumetric data. The video volumetric data is a movie file made up of hundreds of individual volumetric scans (24-30 per second of playback). The video volumetric data is synchronized frame by frame to the adjustable body-form of the automated adjustable mannequin as shown in FIGS. 13A and 14A. Synchronization may be done in real time or as long as it takes and playback of the automated adjustable mannequin is adjusted later. Doing this would allow a new outfit to be put on the green screen body-form of the automated adjustable mannequin and captured in full motion as shown in FIGS. 13B and 14B. The resulting footage of the outfit could be composited with the original model footage for seamless full motion playback of the original model wearing the new outfit as shown in FIGS. 13C and 14C.

Figure 15:
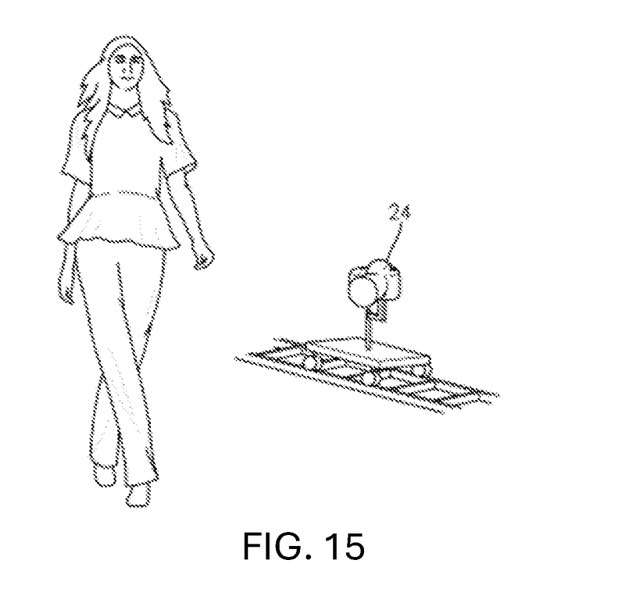
FIG. 15 illustrates a model being photographed on a volumetric stage with motion control film equipment in accordance with embodiments of the invention.
Figure 16:
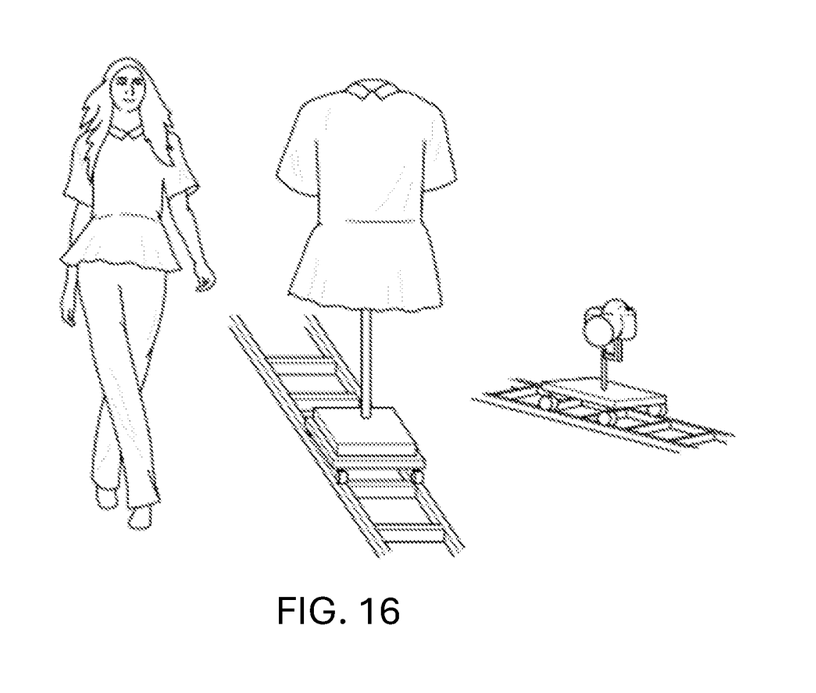
FIG. 16 illustrates a motion control gimbal combined with a body-form of the automated adjustable mannequin in accordance with embodiments of the invention.

In a specific inventive embodiment, a motion control gimbal is combined with a body-form of the automated adjustable mannequin as shown in FIG. 16. The resulting equipment would allow automated full motion compositing of models performance with ongoing new clothing. The original model is photographed on a volumetric stage with motion control film equipment as shown in FIG. 15. The motion of the model and volumetric data is captured and this data is recorded. At any point in the future a new camera setup can be driven by the motion control camera data from the original shoot with the body-form of the automated adjustable mannequin clad in new clothing may be shaped and motion controlled as informed by the volumetric data set as shown in FIG. 16.

In the method describe, a motion control camera 24 tracks live footage of a model, while at the same time 3D data is captured. Typically, for a female model, the model should have her hair up and be in a body suit or under garments. It is noted that the model may need to wear a green body suit if a hair down look is desired. The 3D data is used to shape a body-form of the automated adjustable mannequin. The 3D data is also used to position a gimbal the body-form is connected to. A motion control camera re-films the body-form gimbal with the same lighting and camera movements as the original footage of the model. When combined with camera clips of the real model that can be endlessly redressed and exported as new footage. The sample motion may be as simple as walking on a treadmill to give the outfit motion while the camera comes around to see the outfit at all angles.

It is further noted that the body form of the inventive automated adjustable mannequin may be used to cycle through different body types while photographing cloths. The transforming shape may then trigger the camera so that only a single button press is needed to show all body types within that garment's size range.

In specific inventive embodiments, the motion control information and the body-form information may also be used not only to composite physical clothing onto existing photography but may also serve to inform virtual or 3D clothing onto the original model or a 3D figure thereof. A high-dynamic-range imaging (HDRI) lighting map may be collected at the same time as the original model shoot along with the 3D data and the camera photography then all of the techniques already described may be mixed and matched. The technique can be further expanded to include accurate compositing of 3D clothing on real models. As is known in the video game world, human motion capture is often used to establish realistic character movement. With this technique a series of real outfits/costumes may be captured that could be applied to the virtual character. An HDRI lighting map could be collected at the same time as the original model shoot along with the 3D data and the camera photography, and subsequently all of the techniques already described can be mixed and matched. The HRDI lighting map allows 3D assets to be lit in the computer exactly matching the original environment.

A system block diagram of the major components for photographing a subject is provided. A central process unit (CPU) coordinates and controls the overall operation of the photographing system. The communication interface is representative of various links and input connections and devices illustratively including but not limited to wired and wireless links, optical drives, universal serial bus (USB), flash memory slot, and combinations thereof, for receiving and sending data that may or may not be in real time. The bus links the various components in the system. Memory serves as storage for operating programs and firmware for the photographic system. A database with body types and client information is stored in Memory. Memory is made up of read-only memory ROM and random access memory (RAM). Graphics chipset drives a display. The display may be liquid crystal display (LCD), light emitting diode (LED), or other known display technologies. Control interface may include knobs, buttons, and other touch sensitive controls for selecting various menu items or for inputting alphanumeric information. Sensors sense the presence of a subject and the position of the subject. RFID/barcode is a reader that detects and interprets tags mounted to items of clothing or other equipment in the system. Cameras and lighting are controlled and sequenced by the CPU. Indicators provide visual feedback to system users. In inventive embodiments, the central process unit (CPU), or master and node computers, in the case of many cameras in use—these processing nodes speedup download and system throughput, and the CPU coordinates and controls the plurality of cameras in the studio. In specific inventive embodiments, a communication interface connects the plurality of cameras via one or more of wired and wireless links, optical drives, universal serial bus (USB), flash memory slot, and combinations thereof for receiving and sending data.

In some inventive embodiments, a simple green screen is used when the mannequin is being photographed. The resulting images can be associated with their master model pose and automatically be roughly composited together. This extra step allows the art director to look through the images as if he was looking at a live action contact sheet. By way of example, a set of 100 master model poses are captured and converted to mannequin data, then every new outfit automatically runs through those 100 poses and is automatically composited with the original. As a result, even at a low preview resolution this makes it much easier to pick a pose that best displays the garment. Owing to the speed of process, there is practically little reason not to shoot every item in every body configuration of the possible poses.

In still other inventive embodiments, the fashion style lighting used by the original model photographer could be on a track system with x,y,z coordinates. This position could be recorded as well as the different values set at each light. A matching track system would be installed at the wardrobe photographer's location and like the mannequin, could automatically reconfigure matching the lighting of the master model shots. In practice the wardrobe "photographer" is not needed and is replaced by dressers who changed out the mannequin clothing and pressed the photo GO button.

As a person skilled in the art will recognize from the previous detailed description and from the figures and claims, modifications and changes can be made to the preferred embodiments of the invention without departing from the scope of this invention defined in the following claims.

The invention claimed is:
1. A system for fashion photography, the system comprising; an
    automated adjustable mannequin comprising:
    a body with a torso;
    a set of adjustment dials that adjust contours, measurements, and dimensions of the body; and
    a set of servo motors for automatic adjustment of the set of adjustment dials that are driven by three dimensional (3D) data of a subject that is generated using a photographic stage or photographic booth;
    a computer with a storage medium;
    wherein said photographic stage or photographic booth combine synchronized volumetric capture and fashion photography;

wherein the volumetric capture is configured to record multiple angles with "flat" lighting for creation of a 3D object from the subject;

wherein the fashion photography captures is configured to capture footage of the subject with fashion lighting; and wherein the synchronization between the volumetric capture and fashion photography is accomplished by offsetting the volumetric capture and fashion photography by a fraction of a second.

2. The system of claim 1 wherein the adjustments comprise neck, bust, torso height, waist, and hips, as well as the working height.

3. The system of claim 1 wherein said 3D data is collected during photography of a model as the subject.

4. The system of claim 3 wherein the model is positioned in said photographic stage or photographic booth wherein said photographic stage or photographic booth is a photographic volumetric capture stage.

5. The system of claim 1 wherein said mannequin is programmable such that it morphs with movements captured when a subject is photographed or videoed in different poses on the photographic stage or in the photographic booth.

6. The system of claim 1 wherein said photographic stage is a volumetric capture stage that comprises a group of capture devices generating footage of the subject from multiple angles; and
   wherein said group of capture devices comprise still photography, video, infra-red (IR), stereo, or laser based scans.

7. The system of claim 6 wherein said computer further comprises photogrammetry software or other software to produce the three dimensional (3D) data of the subject as captured by the group of capture devices.

8. The system of claim 6 further comprising a central process unit (CPU), said CPU coordinates and controls said group of capture devices and a lighting system; and
   wherein a communication interface connects said group of capture devices and said lighting system via one or more of wired and wireless links, optical drives, universal serial bus (USB), flash memory slot, and combinations thereof for receiving and sending data.

9. The system of claim 1 wherein the automated adjustable mannequin is programmable such that it morphs and dimensionally adjusts to fit three dimensional (3D) data that define contours and measurements of a subject.

10. The system of claim 1 wherein the photographic stage or photographic booth is configured to capture a series of movements when the subject is photographed or videoed in different poses in real time.

11. The system of claim 1 wherein the storage medium is configured to store the series of movements of the subject as photo or video.

12. A process for producing computer generated fashion model clothing displays, the process comprising:
   obtaining three dimensional (3D) body scan data of a live subject;
   providing the 3D body scan data to an automated adjustable mannequin, the mannequin comprising:
      a body with a torso;
      a set of adjustment dials that adjust contours, measurements, and dimensions of the body; and
      a set of servo motors for automatic adjustment of the set of adjustment dials that are driven by the three dimensional (3D) data;
   photographing articles of clothing on the adjusted mannequin; and
   combining the photographed articles of clothing with images of the live subject using computer generated imagery
   wherein the obtaining three dimensional (3D) body scan data of a live subject further comprises:
   using a photographic stage or photographic booth that combines synchronized volumetric capture and fashion photography;
      wherein the volumetric capture records multiple angles with "flat" lighting for creation of the 3D body scan data of the subject;
   wherein the fashion photography captures footage of the subject with fashion lighting; and
   wherein the synchronization between the volumetric capture and fashion photography is accomplished by offsetting the volumetric capture and fashion photography by a fraction of a second.

13. The process of claim 12 wherein the adjustments to the automated adjustable mannequin comprise neck, bust, torso height, waist, and hips, as well as the working height.

14. The process of claim 12 wherein said automated adjustable mannequin is programmable and morphs with movements captured when a subject is photographed or videoed in different poses on a photographic stage or in a photographic booth.

15. The process of claim 12 further comprising matching lighting of master model shots with a lighting track system installed at a wardrobe photographers location and automatically reconfiguring the matching lighting to the master model shots.

* * * * *